(12) United States Patent
Shimada et al.

(10) Patent No.: US 9,108,645 B2
(45) Date of Patent: Aug. 18, 2015

(54) DRIVING SYSTEM FOR RAILROAD VEHICLE

(75) Inventors: Motomi Shimada, Mito (JP); Takashi Kaneko, Hitachinaka (JP); Kento Mochizuki, Hitachinaka (JP); Seiji Ishida, Hitachinaka (JP)

(73) Assignee: HITACHI, LTD., Tokyo (JP)

( * ) Notice: Subject to any disclaimer, the term of this patent is extended or adjusted under 35 U.S.C. 154(b) by 508 days.

(21) Appl. No.: 13/378,393

(22) PCT Filed: Jun. 15, 2009

(86) PCT No.: PCT/JP2009/060850
§ 371 (c)(1),
(2), (4) Date: Dec. 15, 2011

(87) PCT Pub. No.: WO2010/146643
PCT Pub. Date: Dec. 23, 2010

(65) Prior Publication Data
US 2012/0090499 A1  Apr. 19, 2012

(51) Int. Cl.
*B61C 7/04* (2006.01)
*B61C 3/02* (2006.01)
(Continued)

(52) U.S. Cl.
CPC ... *B61C 3/02* (2013.01); *B60L 9/00* (2013.01); *B60L 9/28* (2013.01); *B60L 11/02* (2013.01); *B60L 11/1801* (2013.01); *B61C 7/04* (2013.01); *B60L 7/16* (2013.01); *B60L 2200/26* (2013.01);
(Continued)

(58) Field of Classification Search
CPC ....... B60L 11/02; B60L 11/1801; B60L 7/16; B60L 9/00; B60L 2200/26; B60L 2260/26; B60L 9/28; B61C 3/02; B61C 7/04; Y02T 10/7005; Y02T 10/7077; Y02T 30/12; Y02T 30/16; Y02T 10/70

USPC .................. 105/26.05, 109; 701/19
See application file for complete search history.

(56) References Cited

U.S. PATENT DOCUMENTS

2004/0216636 A1  11/2004 Emori et al.

FOREIGN PATENT DOCUMENTS

JP  10-66204  3/1998
JP  2001-016701  1/2001
(Continued)

*Primary Examiner* — Helal A Algahaim
*Assistant Examiner* — Charles J Han
(74) *Attorney, Agent, or Firm* — Baker Botts L.L.P.

(57) ABSTRACT

Provided is a high mobility railroad vehicle system configured to reciprocally carry out a direct drive between a non-electrically driven section and an electrically driven section without installing new facilities such as oil supply equipment and without considering distinction between the non-electrically and electrically driven sections. A railroad vehicle system is provided with an overall control apparatus to respectively control an external electric power supply means, an internal electric power supply means, an electricity storage means, electric power conversion means and a motor driving means. The railroad vehicle system judges or previously notifies as to whether the present driving railroad section is the electrically driven section or non-electrically driven section in accordance with driving position information received from a position information generation means such as a ground facility on a railroad equipped outside of the vehicle and a global positioning system (GPS). The system cuts off from an external electric power source in the non-electrically driven section and carries out a smooth shifting control in order to connect to the external electric power source in the electrically driven section.

2 Claims, 7 Drawing Sheets

(51) Int. Cl.
  *B61C 9/24*    (2006.01)
  *B60L 11/18*   (2006.01)
  *B60L 9/00*    (2006.01)
  *B60L 11/02*   (2006.01)
  *B60L 9/28*    (2006.01)
  *B60L 7/16*    (2006.01)

(52) U.S. Cl.
  CPC .............. *B60L 2260/26* (2013.01); *Y02T 10/70* (2013.01); *Y02T 10/7005* (2013.01); *Y02T 10/7077* (2013.01); *Y02T 30/12* (2013.01); *Y02T 30/16* (2013.01)

(56) References Cited

FOREIGN PATENT DOCUMENTS

| | | |
|---|---|---|
| JP | 2004-312953 | 11/2004 |
| JP | 2006-101698 | 4/2006 |
| JP | 2006101698 A * | 4/2006 |
| JP | 2007-295640 | 11/2007 |
| JP | 2007295640 A * | 11/2007 |
| JP | 2008-161055 | 7/2008 |
| JP | 2008161055 A * | 7/2008 |
| JP | 4184879 | 9/2008 |

* cited by examiner

DRIVING SYSTEM FOR RAILROAD VEHICLE

TECHNICAL FIELD

The present invention relates to a driving system for railroad system, and particularly, to a technique for installing external electric power supply means, electricity generation means, and electric power storage means and using electric power obtained by the means to drive a railroad vehicle.

BACKGROUND ART

Iron wheels roll over rail surfaces to drive a railroad vehicle, and the railroad vehicle is characterized by small running resistance compared to an automobile. Particularly, in a recent electric railroad vehicle, a main motor is operated as an electricity generator during braking to obtain braking force. At the same time, regenerative brake control is performed in which the electric energy generated by the main motor is returned to the trolley wire to reuse the electric energy as powering energy of other vehicles. The electric railroad vehicle with the regenerative brake can travel by about half the energy consumption compared to an electric railroad vehicle without the regenerative brake. It can be stated that this is an energy saving method utilizing a feature of the railroad vehicle with low running resistance.

Meanwhile, in a local railroad and the like with low transport density, a diesel railcar that does not require trolley wire, electric power substations, and the like realizes sophisticated passenger services with low cost.

However, the diesel railcar does not include means, such as trolley wire, for transferring energy to other vehicles, and there is no reuse of regenerative energy as in the electric railroad vehicle. Therefore, there is no choice but to depend on the development of a high-mileage engine to realize energy saving in the diesel railcar.

Consequently, a hybrid vehicle with a combination of an engine and an electricity storage apparatus is devised as one of the methods for promoting energy saving in the diesel railcar. The installation of the electricity storage apparatus allows the hybrid vehicle to temporarily absorb, in the electricity storage apparatus, regenerative energy generated during braking. Energy saving is realized by reusing the absorbed regenerative energy as part of energy necessary during powering.

In this way, compared to the conventional diesel railcar that directly transmits an engine output to the wheel and axle through a decelerator to obtain traction force of the vehicle, the hybrid vehicle drives an electricity generator by an engine output to convert the engine output to DC power and converts the DC power to AC power by an inverter apparatus to drive a motor to generate traction force. Meanwhile, during braking, the inverter apparatus converts the AC power generated by the motor to DC power, and the electricity storage apparatus connected to a DC power section is charged with the DC power. It can be stated from another viewpoint that the hybrid vehicle is a system in which an engine electricity generator that generates electric power and an electricity storage apparatus that absorbs regenerative electric power are added to a driving system for electric train.

A configuration and a control system of the hybrid vehicle are described in a railroad vehicle driving system of Patent Literature 1.

FIG. 7 shows a device configuration diagram of the railroad vehicle driving system shown in FIG. 1 of Patent Literature 1. The railroad vehicle driving system includes: a first railroad vehicle 101 including electricity generation means 110, an electric power conversion apparatus 120, a driving motor, and electric power storage means 150; and a second railroad vehicle 102 including the electric power conversion apparatus 120, the driving motor, and the electric power storage means 150, wherein the means are connected by electric power transmission means 140. The railroad vehicle driving system includes electric power management means 200 for controlling generated electric power of the electricity generation means 110 and controlling an amount of stored electricity of the electric power storage means 150, wherein the electric power storage means 150 stores electric power generated by the electricity generation means 110 and regenerative electric power, and the electric power conversion apparatus 120 uses the electricity generation means 110 and the electric power storage means 150 as power sources to drive the driving motor to drive the train.

In this way, in the railroad vehicle driving system shown in FIG. 1 of Patent Literature 1, the electric power is supplied from the first railroad vehicle including the electricity generation means 110 to the second railroad vehicle 102 including the electric power conversion apparatus 120, the driving motor, and the electric power storage means 150 that form a driving system similar to that of an electric train to realize operation of the vehicle.

CITATION LIST

Patent Literature

Patent Literature 1: Japanese Patent Publication No. 4184879

SUMMARY OF INVENTION

Technical Problem

The basic configuration of the driving system of the hybrid vehicle is the same as that of the electric train, and one of the advantages of the hybrid vehicle is that similar driving performance as that of the electric train can be realized.

In the conventional diesel railcar, the driving performance is limited by the engine output characteristics, and the driving characteristics are different from those of the electric train. Therefore, when the diesel railcar travels into an electrified section, an operation diagram specific to the diesel railcar needs to be set. However, the hybrid vehicle can realize the same driving characteristics as those of the electric train when the hybrid vehicle travels into the electrified section and the hybrid vehicle can be operated by the same operation diagram as those of the electric train.

In a normal electric train, electric power is supplied to the driving system from trolley wire installed in the air directly above the vehicle. However, in a conventional hybrid vehicle, engine electricity generation means supplies electric power to the driving system even when the hybrid vehicle travels into the electrified section, and a fuel (such as light oil) for driving the engine is necessary. Therefore, it is considered that an oil supply facility needs to be installed on the assumption that the fuel tank of the vehicle becomes empty even in the electrified section into which the hybrid vehicle travels.

More specifically, there is a problem that new capital investments for the oil supply facility and the like are necessary in the electrified section in order for the hybrid vehicle to run through the non-electrified section and the electrified section.

An object of the present invention is to realize a high mobility railroad vehicle system that can optimally control switching of electric power supply of a hybrid vehicle between an electrified section and a non-electrified section to reciprocally carry out through operation between the sections without installing new facilities such as oil supply equipment in the electrified section and without considering distinction between the non-electrified section and the electrified section.

Solution to Problem

A railroad vehicle system of the present invention includes: first electric power supply means for obtaining electric power from outside of a vehicle; second electric power supply means for generating electric power inside of the vehicle; third electric power supply means installed in the vehicle and having an electricity storage function; electric power conversion means for converting electric power from the first to third electric power supply means to DC power at a first voltage value level; motor driving means for converting the DC power at the first voltage value level to AC power and driving a motor by the AC power; and electrified section judgment means for judging whether a section traveled by the vehicle is an electrified section in which electric power supply from outside of the vehicle is possible or a non-electrified section in which the electric power supply is impossible based on position information received from position information transmission means equipped outside of the vehicle, wherein based on the judgment of the electrified section judgment means, an external electric power source from the first electric power supply means is disconnected during shift from the electrified section to the non-electrified section, and the external electric power source from the first electric power supply means is connected during shift from the non-electrified section to the electrified section. As a result, any of the first electric power supply means as external electric power supply means, the second electric power supply means as internal electric power supply means, and the third electric power supply means as electricity storage means can supply electric power to the motor driving means, and at least one of the first electric power supply means as external electric power supply means, the second electric power supply means as internal electric power supply means, and the third electric power supply means as electricity storage means can absorb the electric power generated by the motor driving means.

Position detection means for receiving driving position information of the vehicle from position information transmission means installed outside of the vehicle, such as a ground unit on the tracks and a global positioning system (GPS), is also included. The presence/absence of an external electric power source, such as trolley wire, is checked based on the received driving position information to predict and determine whether the electric power supply from outside of the vehicle is possible or impossible, that is, whether a present vehicle driving section is the electrified section or the non-electrified section. If the section is the non-electrified section, the first electric power supply means as the external electric power supply means is disconnected from the external electric power source. If the section is the electrified section, the first electric power supply means can be connected to the external electric power source.

Furthermore, provided is a driving system for railroad formation vehicles including a plurality of vehicles connected to a lead vehicle, at least one of the formation vehicles including first electric power supply means for obtaining electric power from outside of the vehicles, the leading vehicle including second electric power supply means for generating electric power inside of the vehicle, at least one of the formation vehicles including: third electric power supply means with an electricity storage function; electric power conversion means for converting electric power from the first to third electric power supply means to DC power at a first voltage value level; and motor driving means for converting the DC power at the first voltage value level to AC power and driving a motor by the AC power, each vehicle including a system overall control apparatus that reciprocally receives control information of the first to third electric power supply means, the electric power conversion means, and the motor driving means through information control means and that comprehensively controls the first to third electric power supply means, the electric power conversion means, and the motor driving means. The means dispersed and disposed on the formation vehicles from the view point of cost reduction, weight distribution, and the like are reciprocally associated and comprehensively controlled. In this way, the means dispersed and disposed on the formation vehicles are comprehensively controlled according to the electrified section and the non-electrified section.

Advantageous Effect of Invention

The present invention can provide a high mobility railroad vehicle system that can reciprocally carry out through operation between a non-electrified section and an electrified section without installing new facilities such as oil supply equipment in the electrified section and without considering distinction between the non-electrified section and the electrified section.

DESCRIPTION OF EMBODIMENT

Hereinafter, an embodiment of the present invention will be described with reference to the drawings.

Embodiment

Figure 1:
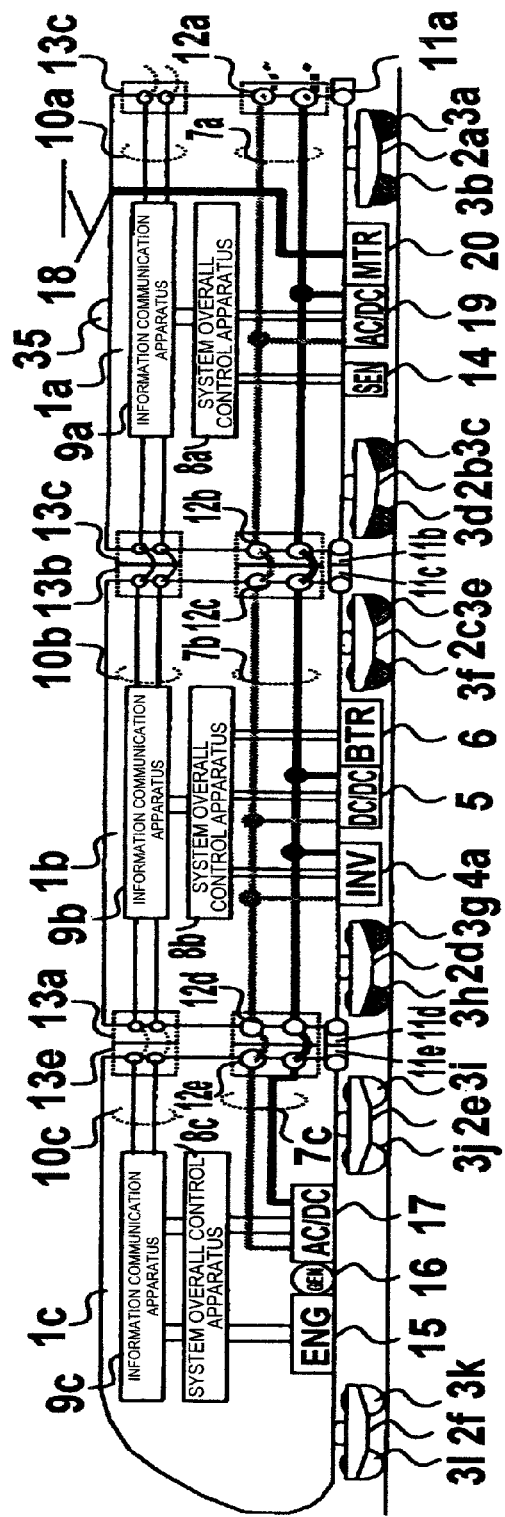
FIG. 1 is a diagram showing a device configuration of an embodiment in a driving system for railroad vehicle of the present invention.

FIG. 1 is a diagram showing a device configuration of an embodiment in a driving system for railroad vehicle of the present invention.

Vehicles $1a$, $1b$, and $1c$ are parts of the vehicles constituting the train formation. A third vehicle $1a$ includes inter-vehicle couplers $11a$ and $11b$. A second vehicle $1b$ includes inter-vehicle couplers $11c$ and $11d$. A lead vehicle $1c$ includes inter-vehicle couplers $11e$ and $11f$. The vehicle $1a$ and the vehicle $1b$ are connected through the inter-vehicle coupler 11b and the inter-vehicle coupler 11c, and the vehicle 1b and the vehicle 1c are connected through the inter-vehicle coupler 11d and the inter-vehicle coupler 11e.

The vehicle 1a is supported, on rail surfaces not shown, by wheel and axle 3a and 3b through a truck 2a and by wheel and axle 3c and 3d through a truck 2b. The vehicle 1b is supported, on the rail surfaces not shown, by wheel and axle 3e and 3f through a truck 2c and by wheel and axle 3g and 3h through a truck 2d. The vehicle 1c is supported, on the rail surfaces not shown, by wheel and axle 3i and 3j through a truck 2e and by wheel and axle 3k and 3l through a truck 2f.

A device configuration of the vehicle 1a will be described.

The vehicle 1a includes: a spot sensor 14 that receives position information from a ground unit, that is, position information transmission means, arranged on the tracks; a current collection apparatus 18 as first electric power supply means; external electric power supply converter apparatus 19 as first electrical power feeding means; a main transformer 20; a system overall control apparatus 8a; an information communication apparatus 9a; and an electrostatic antenna 35.

The main transformer 20 converts AC power supplied by the current collection apparatus 18 to a voltage suitable for the specifications of the external electric power supply converter apparatus 19. The external electric power supply converter apparatus 19 converts the AC power at the voltage converted by the main transformer 20 to DC power and supplies electric power transmission means 7a to transmit the DC power to the other vehicles 1a and 1b in the formation. The spot sensor 14 detects spot information sent from position information transmission means 37 (not shown), such as a ground unit installed outside of the vehicle, and transmits the spot information to the system overall control apparatus 8a. An example of the position information transmission means 37 includes an electrostatic antenna 35 that detects presence/absence information of trolley wire based on a change in the alternating current circulating in the trolley wire and that transmits the presence/absence information to the system overall control apparatus 8a. A global positioning system (GPS) can also be utilized as the position information transmission means 37.

The system overall control apparatus 8a connects to the external electric power supply converter apparatus 19, the spot sensor 14, and the electrostatic antenna 35 and provides control requests Dcnv_a, Dsen_a, and Dant_a to the appararatuses, respectively. The system overall control apparatus 8a also aggregates state information Scnv_a, Ssen_a, and Sant_a of the apparatuses. The system overall control apparatus 8a transmits information Dinf_a received between the spot sensor 14 and the external electric power supply converter apparatus 19 to the information communication apparatus 9a. The information communication apparatus 9a can share the information with information communication apparatuses 9b and 9c of the other vehicles in the formation through information transmission means 10a, 10b, and 10c. More specifically, the information communication apparatus 9a can collect information of the entire train, and the system overall control apparatus 8a selects and receives information Sinf_a necessary to control the spot sensor 14 and the external electric power supply converter apparatus 19.

The vehicle 1a is equipped with electric power system couplers 12a and 12b for connecting the electric power transmission means 7a to the other vehicles in the formation and information system couplers 13a and 13b for connecting the information transmission means 10a to the other vehicles in the formation.

Next, a device configuration of the vehicle 1b will be described.

The vehicle 1b includes an inverter apparatus 4a as motor driving means, a DC/DC converter apparatus 5, an electricity storage apparatus 6 as third electric power supply means, a system overall control apparatus 8b, and an information communication apparatus 9b.

The inverter apparatus 4 converts DC power supplied by electric power transmission means 7b to three-phase AC power to drive a motor 27 not shown. The output of the motor 27 drives all or some of the wheels and axles 3e, 3f, 3g, and 3h through power transmission means not shown to provide acceleration and deceleration force to the vehicle 1b.

The chopper apparatus 5 has a function of circulating a current according to terminal voltages of the input side and the output side when the terminal voltages of the input side and the output side are different. In this case, the terminal of the high voltage side is connected to the electric power transmission means 7b, and the terminal on the low voltage side is connected to the electricity storage apparatus 6. More specifically, the chopper apparatus 5 can charge the electricity storage apparatus 6 with the electric power of the electric power transmission means 7b and discharge the electricity storage apparatus 6 to return the electric power to the power transmission means 7b.

The system overall control apparatus 8b connects to the inverter apparatus 4, the chopper apparatus 5, and the electricity storage apparatus 6 and provides control requests Dinv_b, Dchp_b, and Dbtr_b to the apparatuses, respectively. The system overall control apparatus 8b also aggregates state information Sinv_b, Schp_b, and Sbtr_b of the apparatuses. The system overall control apparatus 8b transmits information Dinf_b received between the inverter apparatus 4, the chopper apparatus 5, and the electricity storage apparatus 6 to the information communication apparatus 9b. The information communication apparatus 9b can share the information with the information communication apparatuses 9a and 9c of the other vehicles in the formation through the information transmission means 10a, 10b, and 10c. More specifically, the information communication apparatus 9b can collect information of the entire train, and the system overall control apparatus 8b selects and receives information Sinf_b necessary to control the inverter apparatus 4, the chopper apparatus 5, and the electricity storage apparatus 6.

The vehicle 1b is equipped with electric power system couplers 12c and 12d for connecting the electric power transmission means 7b to the other vehicles in the formation and information system couplers 13b and 13c for connecting the information transmission means 10b to the other vehicles in the formation.

Next, a device configuration of the vehicle is as the lead vehicle will be described.

The vehicle is includes an engine 15, an electricity generator 16, an engine electricity generation converter apparatus 17, a system overall control apparatus 8c, and an information communication apparatus 9c.

The engine 15 and the electricity generator 16 constitute second electric power supply means for generating electric power inside of the vehicle, and the engine 15 drives the electricity generator 16 to generate three-phase AC power. The engine electricity generation converter apparatus 17 converts the three-phase AC power to DC power and supplies it to electric power transmission means 7c to transmit the DC power to the other vehicles 1a and 1b in the formation vehicles.

The system overall control apparatus 8c connects to the engine 15 and the engine electricity generation converter apparatus 17 and provides control requests Deng_c and Dcnv_c to the apparatuses, respectively. The system overall control apparatus 8*c* also aggregates state information Seng_c and Scnv_c of the apparatuses. The system overall control apparatus 8*c* transmits information Dinf_c received between the engine 15 and the engine electricity generation converter apparatus 17 to the information communication apparatus 9*c*. The information communication apparatus 9*c* can share the information with the information communication apparatuses 9*a* and 9*b* of the other vehicles in the formation through the information transmission means 10*c*. More specifically, the information communication apparatus 9*c* can collect information of the entire train, and the system overall control apparatus 8*c* selects and receives information Scnv_c necessary to control the engine 15 and the engine electricity generation converter apparatus 17.

The vehicle 1*c* is equipped with an electric power system coupler 12*e* for connecting the electric power transmission means 7*c* to the other vehicles in the formation vehicles and an information system coupler 13*e* for connecting the information transmission means 10*c* to the other vehicles in the formation vehicles.

The external electric power supply converter 19, the engine electricity generation converter 17, and the chopper apparatus 5 constitute electric power conversion means for converting the electric power from the current collection apparatus 18 as the first electric power supply means, the engine 15 and the electricity generator 16 as the second electric power supply means, and the electricity storage apparatus 6 as the third electric power supply means into DC power at a certain voltage value level.

According to the configuration, the presence/absence of an external electric power, such as trolley wire, can be checked based on received traveling position information to determine whether electric power supply from outside of the vehicle is possible or impossible, that is, whether the present track being traveled over is an electrified section or a non-electrified section. The external electric power supply means can be disconnected from the external electric power source if the electric power supply from outside of the vehicle is impossible. The external electric power supply means can be connected to the external electric power source if the electric power supply from outside of the vehicle is possible.

Furthermore, the arrangement of the system overall control apparatus that controls the current collection apparatus, the engine electricity generator, the electricity storage apparatus, the external electric power supply converter apparatus, the engine electricity generation converter apparatus, and the inverter apparatus and the information communication apparatus that reciprocally receives the control information of the system overall control apparatus allows comprehensive control of the devices. If the electric power supply from outside of the vehicle is possible, the supplied electric power from the current collection apparatus serves as the main electric power supply to the inverter apparatus, and the external electric power supply converter apparatus can control the DC power section to a predetermined voltage value. If the electric power supply from the current collection apparatus is impossible, the supplied electric power from the engine electricity generator serves as the main electric power supply to the inverter apparatus, and the engine electricity generation converter can control the DC voltage section to a predetermined voltage value.

Therefore, a high mobility railroad vehicle system can be realized in which through operation can be reciprocally carried out between a non-electrified section and an electrified section without installing new facilities such as oil supply equipment in the electrified section and without considering distinction between the non-electrified section and the electrified section.

Figure 2:
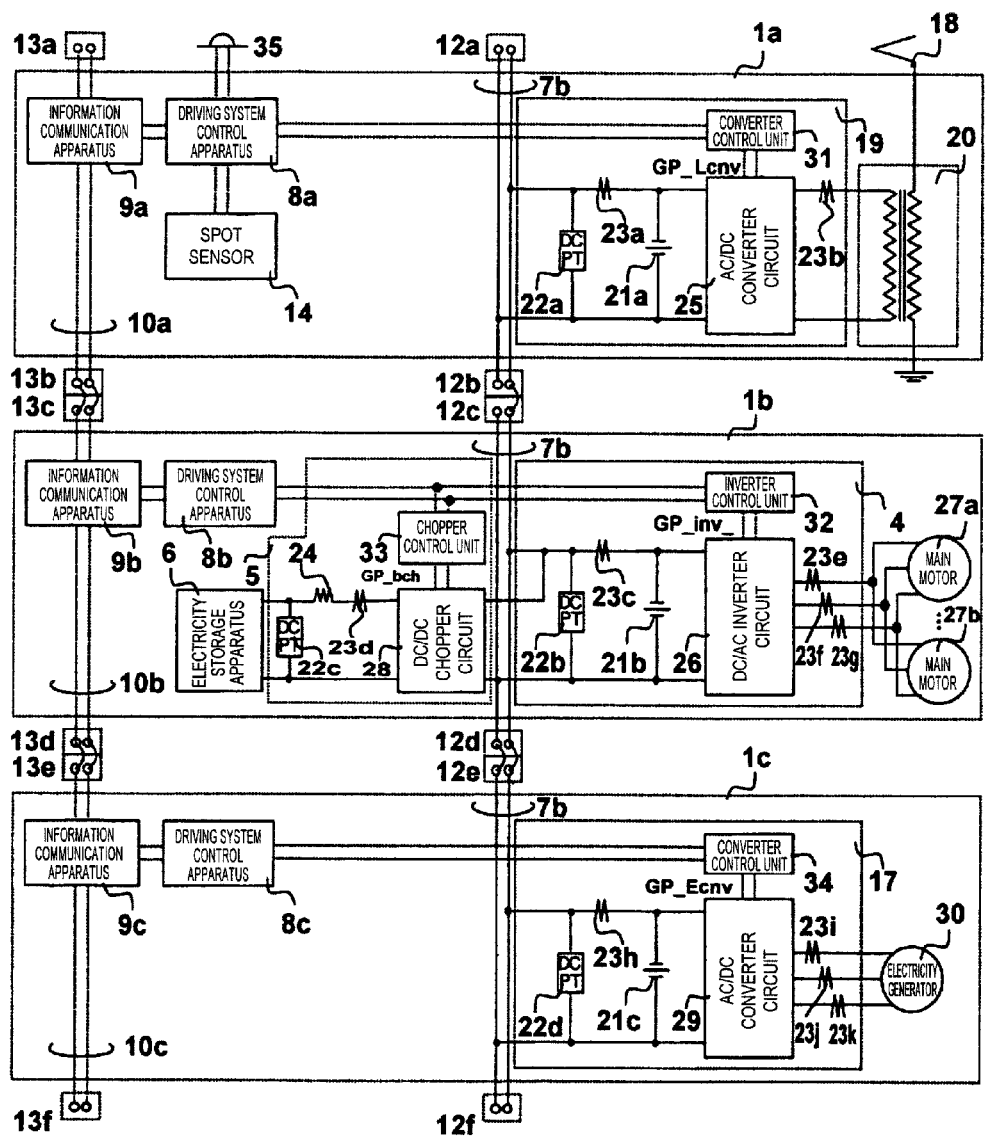
FIG. 2 is a diagram showing details of the device configuration according to the embodiment of the present invention.

FIG. 2 is a diagram showing details of the device configuration according to the embodiment of the present invention.

The vehicle 1*a* includes the current collection apparatus 18, the main transformer 20, the external electric power supply converter apparatus 19, the system overall control apparatus 8*a*, the information communication apparatus 9*a*, the position sensor 14, and the electrostatic antenna 35.

The main transformer 20 converts the AC power supplied by the current collection apparatus 18 to a voltage suitable for the specifications of the external electric power supply converter apparatus 19. The external electric power supply converter apparatus 19 converts the AC power with the voltage converted by the main transformer 20 to AC power and supplies it to the electric power transmission means 7*a* to transmit the AC power to the other vehicles 1*a* and 1*b* in the formation.

The external electric power supply converter circuit 25 controls a switching element not shown to convert the AC power supplied from the main transformer 20 to DC power based on a switching signal GP_p output by an external electric power supply converter control unit 31. A voltage sensor 22*a* that measures a supplied voltage from the electric power transmission means 7*a*, a current sensor 23*a* that measures a supplied current, and a current sensor 23*b* that measures the current of the AC power supplied from the main transformer are further arranged. A filter capacitor 21*a* is connected in parallel with the input end of the external electric power supply converter circuit 25 and removes change components of the current flowing in or out of the external electric power supply converter circuit 25.

The spot sensor 14 detects spot information transmitted from the position information transmission means 37 (not shown), such as a ground unit, equipped outside of the vehicle and transmits the spot information to the system overall control apparatus 8*a*. The electrostatic antenna 35 as the position information transmission means 37 detects presence/absence information of trolley wire based on a change in the alternating current circulating in the trolley wire and transmits the presence/absence information to the system overall control apparatus 8*a*. The global positioning system (GPS) can also be utilized as the position information transmission means 37.

The system overall control apparatus 8*a* connects to the external electric power supply converter control unit 31, the spot sensor apparatus 14, and the electrostatic antenna 35 and provides control requests Dcnv_a, Dsen_a, and Dant_a to the apparatuses. The system overall control apparatus 8*a* also aggregates state information Scnv_a, Ssen_a, and Sant_a of the apparatuses. The system overall control apparatus 8*a* transmits the information Dinf_a received between the external electric power supply converter control unit 31, the spot sensor apparatus 14, and the electrostatic antenna 35 to the information communication apparatus 9*a*. The information communication apparatus 9*a* can share the information with the information communication apparatuses 9*b* and 9*c* of the other vehicles in the formation through the information transmission means 10*a*. More specifically, the information communication apparatus 9*a* can collect information of the entire train, and the system overall control apparatus 8*a* selects and receives information Sinf_c necessary to control the external electric power supply converter control unit 31, the spot sensor apparatus 14, and the electrostatic antenna 35.

The vehicle 1*b* includes the inverter apparatus 4, motors 27*a* and 27*b*, the chopper apparatus 5, the electricity storage apparatus 6, the system overall control apparatus 8b, and the information communication apparatus 9b.

The inverter apparatus 4 converts the DC power supplied by the electric power transmission means 7b to three-phase AC power to drive the motors 27a and 27b. Although the motors driven by the inverter apparatus 4 are the motors 27a and 27b here, this does not limit the number of motors driven by the inverter apparatus 4. The inverter circuit 26 controls a switching element not shown based on a switching signal GP_t output by the inverter control unit 32 to convert the electric power of the DC section to variable voltage, variable frequency three-phase AC power to drive the motors 27a and 27b. A voltage sensor 22b for measuring a supplied voltage from the electric power transmission means 7b and a current sensor 23c for measuring a supplied current are also arranged. A filter capacitor 21b is connected in parallel with the input end of the inverter circuit 26 and removes change components of the current flowing in or out of the inverter circuit 26.

The chopper apparatus 5 has a function of circulating the current according to the terminal voltages on the input side and the output side even if the terminal voltages of the input side and the output side are different in the connection. In this case, the terminal on the high voltage side is connected to the electric power transmission means 7b, and the terminal on the low voltage side is connected to the electricity storage apparatus 6. A smoothing reactor 24 is connected between the electricity storage apparatus 6 and the chopper circuit 28, and the smoothing rector 24 plays a role of smoothing a chopper current in a buck-boost chopper operation described below and a role of primarily storing electric energy in a boost chopper operation. The chopper circuit 28 controls a switching element not shown based on a switching signal GP_d output by a chopper control unit 33 to circulate the current while maintaining or controlling an inter-terminal voltage between the terminal on the high voltage side connected to the electric power transmission means 7b and the terminal on the low voltage side connected to the electricity storage apparatus 6. The current sensor 24 for measuring the supplied current from the electricity storage apparatus 6 is arranged between the electricity storage apparatus 6 and the chopper circuit 28, and a voltage measurement device 22c to measure the output voltage of the electricity storage apparatus 6 is arranged between the output terminals of the electricity storage apparatus 6. More specifically, the chopper apparatus 5 can charge the electricity storage apparatus 6 based on the electric power of the electric power transmission means 7b and can discharge the electricity storage apparatus 6 to return the electric power to the electric power transmission means 7b.

The system overall control apparatus 8b connects to the inverter control unit 32, the chopper control unit 33, and the electricity storage apparatus 6 and provides control requests Dinv_b, Dbch_b, and Dbtr_b. The system overall control apparatus 8b also aggregates state information Sinv_b, Sbch_b, and Sbtr_b of the apparatuses. The system overall control apparatus 8b transmits information Dinf_b received between the inverter control unit 32, the chopper control unit 33, and the electricity storage apparatus 6 to the information communication apparatus 9b. The information communication apparatus 9b can share the information with the information communication apparatus 9a of the other vehicles in the formation through the information transmission means 10a and 10b. More specifically, the information communication apparatus 9b can collect information of the entire train, and the system overall control apparatus 8b selects and receives information Sinf_b necessary to control the inverter control unit 32, the chopper control unit 13, and the electricity storage apparatus 6.

The vehicle 1b is also equipped with the electric power system couplers 12c and 12d for connecting the electric power transmission means 7b to the other vehicles in the formation and information system couplers 13c and 13d for connecting the information transmission means 10b to the other vehicles in the formation.

The vehicle 1c includes an electricity generator 30, the engine electricity generation converter apparatus 17, the system overall control apparatus 8c, and the information communication apparatus 9c.

The electricity generator 30 is driven by power, such as an engine not shown, to generate three-phase AC power. The engine electricity generation converter apparatus 17 converts the three-phase AC power generated by the electricity generator 30 to DC power and supplies the DC power to the electric power transmission means 7c.

An engine electricity generation converter circuit 29 controls a switching element not shown based on a switching signal GP_e output by an engine electricity generation converter control unit 34 to convert the three-phase AC power generated by the electricity generator 30 to DC power. A voltage sensor 22d for measuring a supplied voltage from the electric power transmission apparatus 7c, a current sensor 23h for measuring a supplied current, and current sensors 23i, 23j, and 23k that measure currents of the phases of the three-phase AC power generated by the electricity generator 30 are also arranged. A filter capacitor 21c is connected in parallel to the input end of the engine electricity generation converter circuit 29 and removes change components of the current flowing in or out of the engine electricity generation converter circuit 29.

The system overall control apparatus 8c connects to the engine electricity generation converter control unit 34 and the engine 15 not shown and provides control requests Deng_c and Dcnv_c. The system overall control apparatus 8c also aggregates state information Scnv_c and Seng_c of the apparatuses. The system overall control apparatus 8c transmits information Dinf_c received between the engine electricity generation converter control unit 34 and the engine 15 not shown to the information communication apparatus 9c. The information communication apparatus 9c can share the information with the information communication apparatuses 9a and 9b of the other vehicles in the formation through the information transmission means 10c. More specifically, the information communication apparatus 9c can collect information of the entire train, and the system overall control apparatus 8c selects and receives information Sinf_c necessary to control the engine electricity generation converter apparatus 17 and the engine 15 not shown.

As described above, according to the configuration, the presence/absence of the external electric power source, such as trolley wire, can be checked based on the received driving position information, and whether the electric power supply from outside of the vehicle is possible or impossible, that is, whether the section is an electrified section or a non-electrified section, can be determined. If the electric power supply from outside of the vehicle is impossible, the external electric power supply means can be disconnected from the external electric power source. If the electric power supply from outside of the vehicle is possible, the external electric power supply means can be connected to the external electric power source.

Furthermore, the arrangement of the system overall control apparatus that controls the current collection apparatus, the engine electricity generator, the electricity storage apparatus, the external electric power supply converter apparatus, the engine electricity generation converter apparatus, and the inverter apparatus and the information communication apparatus that reciprocally receives the control information of the system overall control apparatus allows comprehensive control of the devices. If the electric power supply from outside of the vehicle is possible, the supplied electric power from the current collection apparatus serves as the main electric power supply to the inverter apparatus, and the external electric power supply converter apparatus can control the DC power section to a predetermined voltage value. If the electric power supply from the current collection apparatus is impossible, the supplied electric power from the engine electricity generator serves as the main electric power to the inverter apparatus, and the engine electricity generation converter can control the DC voltage section to a predetermined voltage value.

Therefore, a high mobility railroad vehicle system can be provided in which through operation can be reciprocally carried out between a non-electrified section and an electrified section without installing new facilities such as oil supply equipment in the electrified section and without considering distinction between the non-electrified section and the electrified section.

Figure 3:
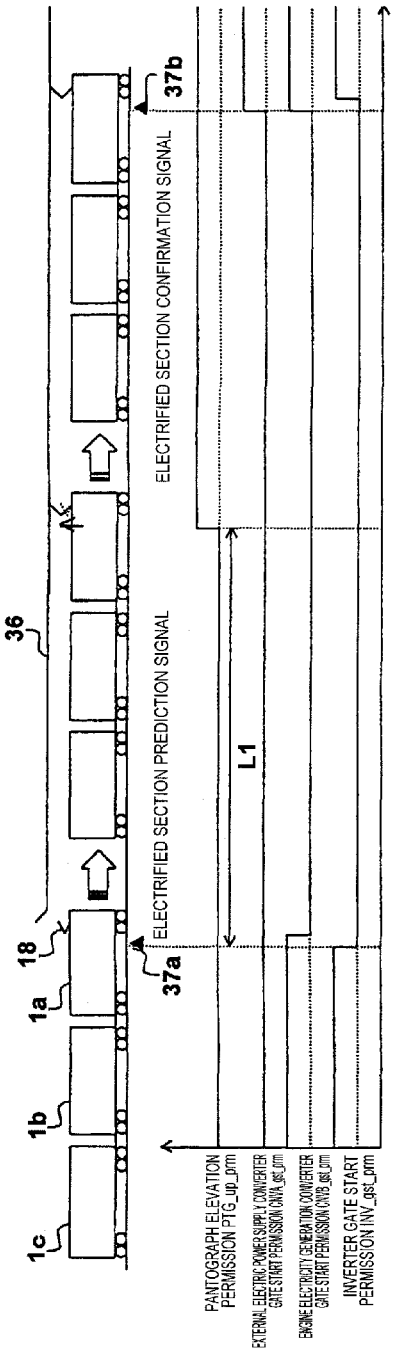
FIG. 3 is a diagram showing a device operation according to the embodiment of the present invention.
Figure 3:
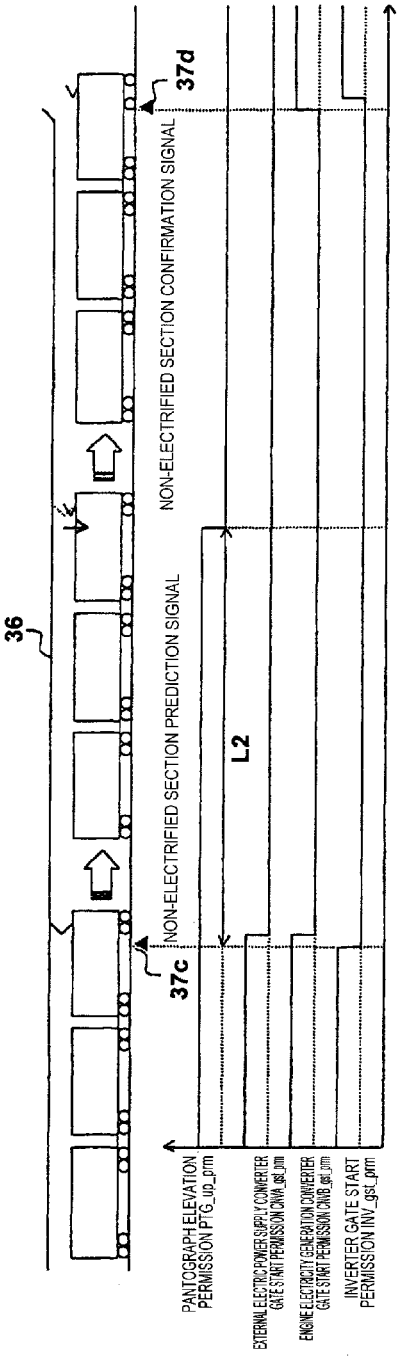

FIG. 3 is a diagram showing a device operation according to the embodiment of the present invention.

FIG. 3 describes operations of the current collection apparatus 6, the external electric power supply converter apparatus 19, the engine electricity generation converter apparatus 17, and the inverter apparatus 4 when the vehicles 1a, 1b, and is enter the electrified section from the non-electrified section and operations of the current collection apparatus 6, the external electric power supply converter apparatus 19, the engine electricity generation converter apparatus 17, and the inverter apparatus 4 when the vehicles 1a, 1b, and 1c enter the non-electrified section from the electrified section.

First, the device operations when the vehicles 1a, 1b, and 1c enter the electrified section from the non-electrified section will be described.

When the vehicles 1a, 1b, and 1c travel in the non-electrified section, a pantograph elevation permission flag PTG_up_prm indicates "0", and the current collection apparatus 6 is in a descent state at this time. Since the electric power supply from the current collection apparatus 6 cannot be obtained in the non-electrified section, an external electric power supply converter gate start permission flag CNVA_gst_prm is set to "0", that is, the electric power conversion in the external electric power supply converter apparatus 19 is stopped. On the other hand, an engine electricity generation converter gate start permission flag CNVB_gst_prm is set to "1" to obtain the electric power supply from the engine electricity generation, that is, the electric power conversion in the engine electricity generation converter apparatus 17 is activated. During acceleration or braking, an inverter gate start permission flag INV_gst_prm is set to "1", that is, the electric power conversion in the inverter apparatus 4 is activated.

When the spot sensor 14 mounted on the vehicle 1a receives an "electrified section prediction signal" from position information transmission means 37a installed on the non-electrified section side relative to the spot of the start of the electrified section, the inverter gate start permission flag INV_gst_prm is set to "0", that is, the electric power conversion in the inverter apparatus 4 is stopped. The engine electricity generation converter gate start permission flag CNVB_gst_prm is set to "0", that is, the electric power conversion in the engine electricity generation converter apparatus 17 is stopped.

When the vehicles 1a, 1b, and 1c reach a spot traveling a preset distance L1 from the spot of the reception of the "electrified section prediction signal", the pantograph elevation permission flag PTG_up_prm is set to "1", that is, the current collection apparatus 6 is elevated to touch the electric power supply means 36. As a result, the vehicles 1a, 1b, and 1c complete the preparation of obtaining necessary electric power from the electric power supply means 36.

When the spot sensor 14 mounted on the vehicle 1a receives an "electrified section confirmation signal" from position information *transmission means 37b that is installed on the electrified section side relative to the spot of the start of the electrified section and that indicates that the vehicle 1a is traveling in the electrified section, the external electric power supply converter gate start permission flag CNVA_gst_prm is set to "1", that is, the electric power conversion in the external electric power supply converter apparatus 19 is activated. As a result, the external electric power supply converter apparatus 19 converts the AC power obtained from the electric power supply means 36 to DC power, and the DC power is supplied to the inverter apparatus 4. The engine electricity generation converter gate start permission flag CNVB_gst_prm is set to "1", that is, the electric power conversion in the engine electricity generation converter apparatus 17 is activated to enable the supply of power from the engine electricity generation. Subsequently, the inverter gate start permission flag INV_gst_prm is set to "1", that is, the electric power conversion in the inverter apparatus 4 is activated.

Next, the device operations when the vehicles 1a, 1b, and 1c enter the non-electrified section from the electrified section will be described.

When the vehicles 1a, 1b, and 1c travel in the electrified section, the pantograph elevation permission flag PTG_up_prm is set to "1", that is, the current collection apparatus 6 is elevated to touch the electric power supply means 35. Since the electric power supply from the current collection apparatus 6 can be obtained in the electrified section, the external electric power supply converter gate start permission flag CNVA_gst_prm is set to "1", that is, the electric power conversion in the external electric power supply converter apparatus 19 is activated. As a result, the external electric power supply converter apparatus 19 converts the AC power obtained from the electric power supply means 36 to DC power, and the DC power is supplied to the inverter apparatus 4. Furthermore, the engine electricity generation converter gate start permission flag CNVB_gst_prm is set to "1", that is, the electric power conversion in the engine electricity generation converter apparatus 17 is activated to enable the electric power supply from the engine electricity generation to the inverter apparatus 4. During acceleration or braking, the inverter gate start permission flag INV_gst_prm is set to "1", that is, the electric power conversion in the inverter apparatus 4 is activated.

When the spot sensor 14 mounted on the vehicle 1a receives a "non-electrified section prediction signal" from position information transmission means 37c installed on the electrified section side relative to the spot of the start of the non-electrified section, the inverter gate start permission flag INV_gst_prm is set to "0", that is, the electric power conversion in the inverter apparatus 4 is stopped. Next, the external electric power supply converter gate start permission flag CNVA_gst_prm is set to "0", that is, the electric power conversion in the external electric power supply converter 19 is stopped. Furthermore, the engine electricity generation converter gate start permission flag CNVB_gst_prm is set to "0", that is, the electric power conversion in the engine electricity generation converter apparatus 17 is stopped.

When the vehicles 1a, 1b, and 1c reach a spot traveling a preset distance L2 from the spot of the reception of the "electrified section prediction signal", the pantograph elevation permission flag PTG_up_prm is set to "0", that is, the current collection apparatus 6 is lowered. As a result, the vehicles 1a, 1b, and 1c complete the preparation to finish the electric power supply from the electric power supply means 36.

When the spot sensor 14 mounted on the vehicle 1a receives a "non-electrified section confirmation signal" from position information transmission means 36d installed immediately before the spot of the start of the electrified section, the engine electricity generation converter gate start permission flag CNVB_gst_prm is set to "1", that is, the electric power conversion in the engine electricity generation converter apparatus 17 is activated to enable the electric power supply from the engine electricity generation to the inverter apparatus 4. During acceleration or braking, the inverter gate start permission flag INV_gst_prm is set to "1", that is, the electric power conversion in the inverter apparatus 4 is activated.

Figure 4:
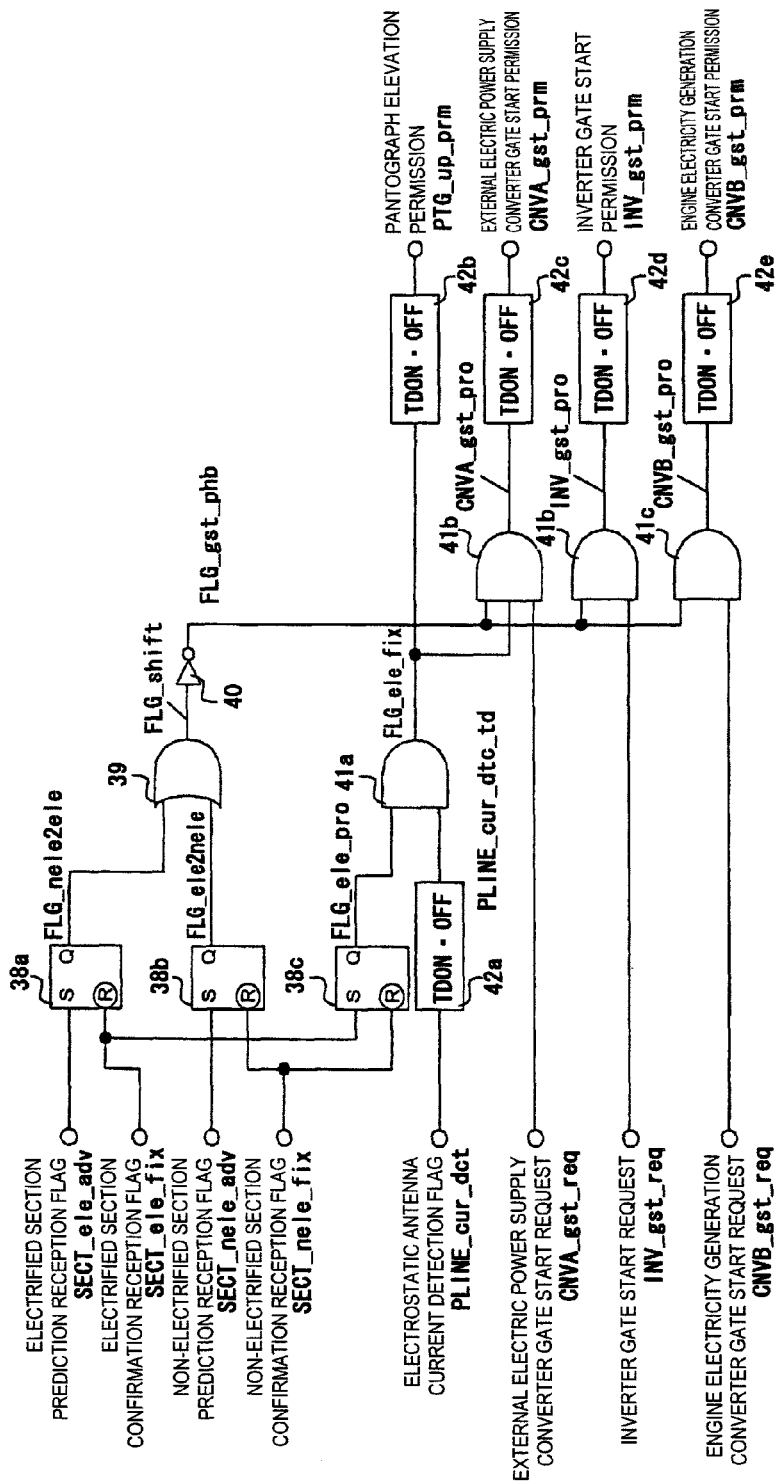
FIG. 4 is a control block diagram for realizing the device operation according to the embodiment of the present invention.

FIG. 4 is a control block diagram for realizing the device operations according to an embodiment of the present invention.

A logic storage circuit 38a is a reset-priority flip-flop circuit, in which an electrified section prediction reception flag SECT_ele_adv serves as a set input, and an electrified section confirmation reception flag SECT_ele_fix serves as a reset input. The logic storage circuit 38a outputs a non-electrified section to electrified section shifting flag FLG_nele2ele.

A logic storage circuit 38b is a reset-priority flip-flop circuit, in which a non-electrified section prediction reception flag SECT_nele_adv serves as a set input, and a non-electrified section confirmation reception flag SECT_nele_fix serves as a reset input. The logic storage circuit 38b outputs an electrified section to non-electrified section shifting flag FLG_ele2nele.

A logic storage circuit 38c is a reset-priority flip-flop circuit, in which the electrified section confirmation reception flag SECT_nele_fix serves as a set input, and the non-electrified section confirmation reception flag SECT_ele_fix serves as a reset input. The logic storage circuit 38c outputs an electrified section preliminary flag FLG_ele_pro.

A logical OR circuit 39 receives the non-electrified section to electrified section shifting flag FLG_nele2ele and the electrified section to non-electrically section shifting flag FLG_ele2nele as inputs to output an electrified section/non-electrified section shifting flag FLG_shift that is a logical OR of the flags.

A logic inverting circuit 40 inverts the logic of the electrified section/non-electrified section shifting flag FLG_shift to output a gate start prohibition flag FLG_gst_phb that prohibits the gate start of the inverter apparatus 4, the external electric power supply converter apparatus 19, and the engine electricity generation converter apparatus 17 during the electrified section/non-electrified section shifting.

A logic delay circuit 42a inputs an electrostatic antenna current detection flag PLINE_cur_dct to delay one or both of the rise and fall of the flag by a predetermined time to output a delayed electrostatic antenna current detection flag PLINE_cur_td.

A logical AND circuit 41a receives the electrified section preliminary flag FLG_ele_pro and the delayed electrostatic antenna current detection flag PLINE_cur_td as inputs to output an electrified section fixation flag FLG_ele_fix that is a logical AND of the flags. Further, a logic delay circuit 42b delays one or both of the rise and fall of the electrified section fixation flag FLG_ele_fix by a predetermined time to output a pantograph elevation permission flag PTG_up_prm.

A logical AND circuit 41b receives the gate start prohibition flag FLG_gst_phb, the electrified section fixation flag FLG_ele_fix, and an external electric power supply converter gate start request flag CNVA_gst_req as inputs to output an external electric power supply converter gate start preliminary flag CNVA_gst_pro that is a logical AND of the flags. A logic delay circuit 42c delays one or both of the rise and fall of the external electric power supply converter gate start preliminary flag CNVA_gst_pro by a predetermined time to output the external electric power supply converter gate start permission flag CNVA_gst_prm.

A logical AND circuit 41c receives the gate start prohibition flag FLG_gst_phb and the inverter gate start request flag INV_gst_req as inputs to output an inverter gate start preliminary flag INV_gst_pro that is a logical AND of the flags. Further, a logic delay circuit 42d delays one or both of the rise and fall of the inverter gate start preliminary flag INV_gst_pro by a predetermined time to output the inverter gate start permission flag INV_gst_prm.

A logical AND circuit 41d receives the gate start prohibition flag FLG_gst_phb and the engine electricity generation converter gate start request flag CNVB_gst_req as inputs to output an engine electricity generation converter gate start preliminary flag CNVB_gst_pro that is a logical AND of the flags. A logic delay circuit 42e delays one or both of the rise and fall of the engine electricity generation converter gate start preliminary flag CNVB_gst_pro by a predetermined time to output the engine electricity generation converter gate start permission flag CNVB_gst_prm.

Figure 5:
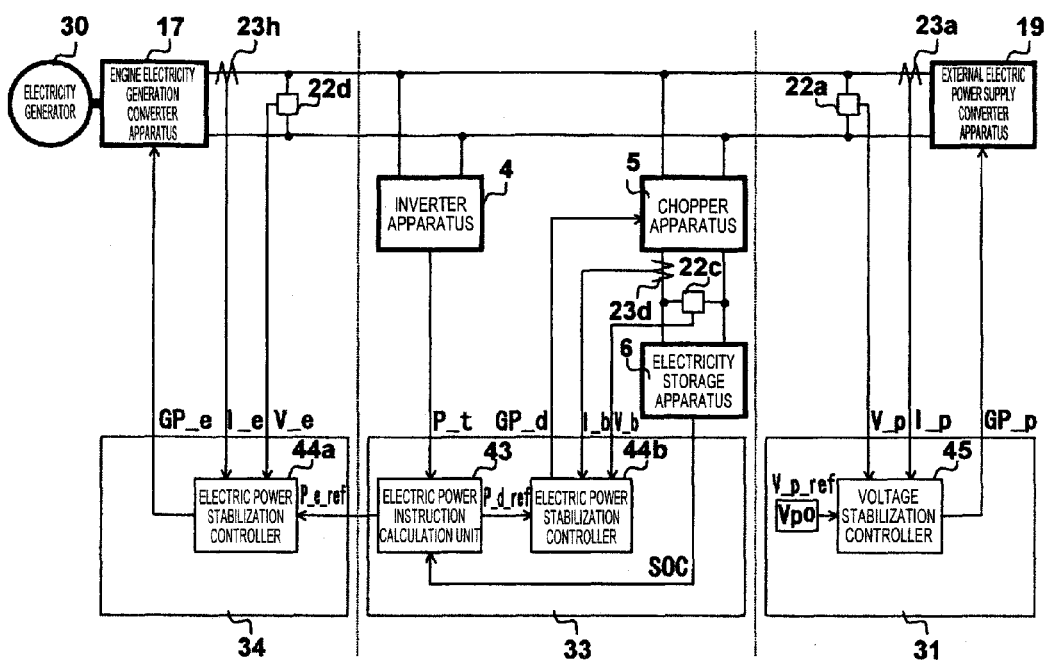
FIG. 5 is a diagram showing device output balance control in an electrified section according to the embodiment of the present invention.

FIG. 5 is a diagram showing device output balance control in the electrified section according to the embodiment of the present invention.

Configurations of control during powering and during braking in the electrified section in the device output balance control will be described here.

A voltage stabilization controller 45a included in the external electric power supply converter control unit 31 handles a DC power section reference voltage V_p_ref, a DC-side terminal voltage V_p of the external electric power supply converter apparatus 19 detected by the voltage sensor 22a, and a DC-side input/output current I_p of the external electric power supply converter apparatus 19 detected by the current sensor 23a as inputs to calculate and output a control signal GP_p provided to the external electric power supply converter apparatus 19 to cause the DC-side terminal voltage V_p to follow the DC power section reference voltage V_p_ref.

On each occasion, the inverter apparatus 4 calculates and outputs inverter electric power P_t necessary to power or brake the vehicles. In the inverter power P_t necessary to power or brake the vehicles, electric power that cannot be supplied only by the external electric power supply converter apparatus 19 is supplemented by the electricity storage apparatus 6 and the engine 15. An electric power instruction calculation unit 43 included in the chopper control unit 33 handles the inverter electric power P_t and an amount of stored electricity SOC of the electricity storage apparatus 6 as inputs and calculates and outputs a supplement electric power instruction P_d_ref distributed to the chopper apparatus 5 and a supplement electric power instruction P_e_ref distributed to the engine electricity generation converter apparatus according to the amount of stored electricity SOC.

An electric power stabilization controller 44b included in the chopper control unit 33 handles the supplement electric power instruction P_d_ref to the chopper apparatus 5, an input/output current I_b of the electricity storage apparatus 6 detected by a current sensor 23d, and a terminal voltage V_d of the electricity storage apparatus 6 detected by the voltage sensor 22c as inputs to output a control signal GP_d provided to the chopper apparatus 5 to control input/output electric power $I\_b \times V\_b$ of the electricity storage apparatus 6 to follow the supplement electric power instruction $P\_d\_ref$ for the chopper apparatus 5.

An electric power stabilization controller 44a included in the engine electricity generation converter control unit 34 receives the supplement electric power instruction $P\_e\_ref$ to the engine electricity generation converter apparatus 17, an input/output current $I\_e$ of the engine electricity generation converter apparatus 17 detected by the current sensor 23h, and a DC-side terminal voltage $V\_e$ of the engine electricity generation converter apparatus detected by the voltage sensor 22d as inputs to output a control signal $GP\_e$ provided to the engine electricity generation converter apparatus 17 to control input/output electric power $I\_e \times V\_e$ of the engine electricity generation converter apparatus 17 to follow the supplement electric power instruction $P\_d\_ref$ for the engine electricity generation converter apparatus 17.

According to the configuration described above, during powering in the electrified section, the external electric power supply converter apparatus 19 controls the voltage of a DC power section (A) to follow a predetermined value and supplies the inverter apparatus 4 with electric power necessary to drive the vehicles. If the electric power necessary to drive the vehicles cannot be supplied only by the external electric power supply converter apparatus 19, the inverter apparatus 4 estimates shortfall of electric power, and the electricity storage apparatus 6 supplies electric power at least greater than the shortfall of electric power to the DC power section (A) through the engine electricity generation converter apparatus 17 or the chopper apparatus 5 while holding the voltage.

During braking in the electrified section, the external electric power supply converter apparatus 19 controls the voltage of the DC power section (A) to follow a predetermined value, and electric power generated by braking of the vehicles supplied from the inverter apparatus 4 is absorbed. If the electric power generated by braking of the vehicles supplied from the inverter apparatus 4 cannot be absorbed only by the external electric power supply converter apparatus 19, the inverter apparatus 4 estimates shortfall electric power, and the electric power at least greater than the shortfall of electric power is absorbed by the chopper apparatus 5 and stored in the electricity storage apparatus 6.

As described above, according to the configuration, the presence/absence of the external electric power source, such as trolley wire, can be checked based on the received driving position information, and whether the electric power supply from outside of the vehicle is possible or impossible can be determined. If the electric power supply from outside of the vehicle is impossible, the external electric power supply means can be disconnected from the external electric power source. If the electric power supply from outside of the vehicle is possible, the external electric power supply means can be connected to the external electric power source. Furthermore, the arrangement of the system overall control apparatus that controls the current collection apparatus, the engine electricity generator, the electricity storage apparatus, the external electric power supply converter apparatus, the engine electricity generation converter apparatus, and the inverter apparatus and the information communication apparatus that reciprocally receives the control information of the system overall control apparatus allows comprehensive control of the devices. If the electric power supply from outside of the vehicle is possible, the supplied electric power from the current collection apparatus serves as the main electric power supply to the inverter apparatus, and the external electric power supply converter apparatus can control the DC power section to a predetermined voltage value.

Therefore, a high mobility railroad vehicle system can be provided in which through operation can be reciprocally carried out between a non-electrified section and an electrified section without installing new facilities such as oil supply equipment in the electrified section and without considering distinction between the non-electrified section and the electrified section.

Figure 6:
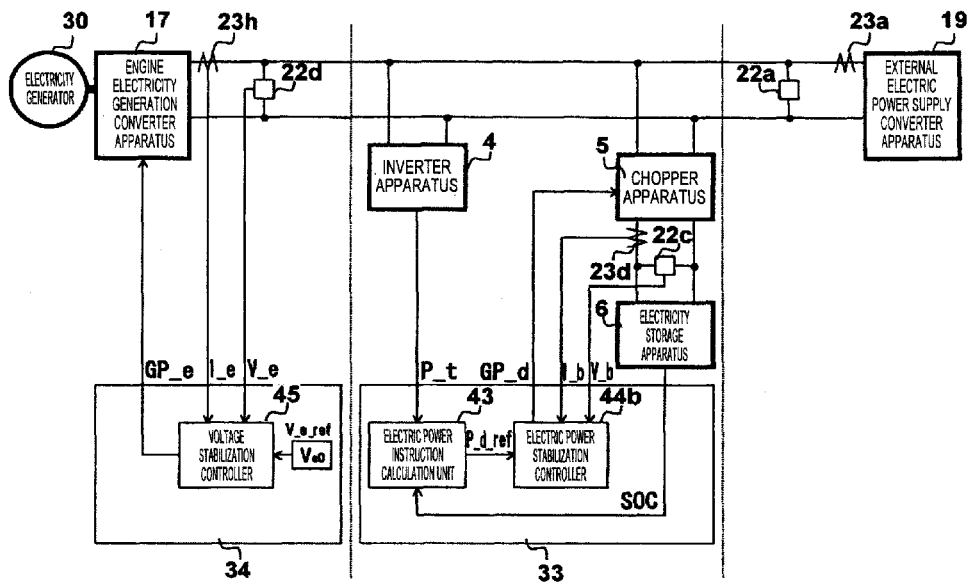
FIG. 6 is a diagram showing device output balance control in a non-electrified section according to the embodiment of the present invention.
Figure 6:
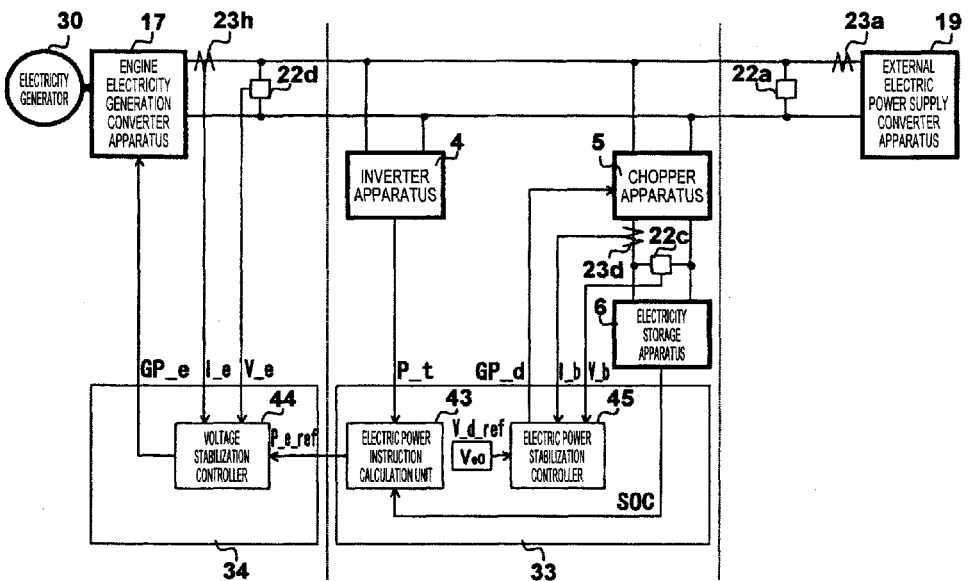
Figure 7:
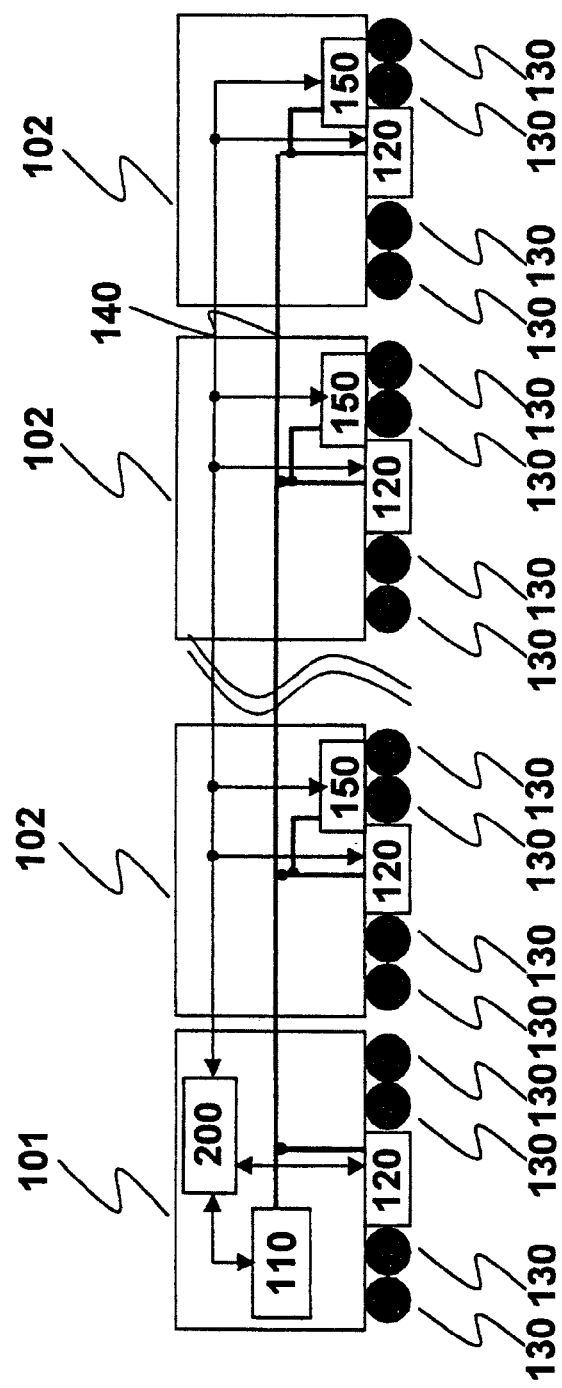
FIG. 7 is a diagram showing a conventional railroad vehicle driving system.

FIG. 6 is a diagram showing device output balance control in the non-electrified section according to an embodiment of the present invention.

First, in the device output balance control, configurations of control during powering in the non-electrified section will be described.

A voltage stabilization controller 45b included in the engine electricity generation converter control unit 34 receives a DC power section reference voltage $V\_e\_ref$, the DC-side terminal voltage $V\_e$ of the engine electricity generation converter apparatus 17 detected by the voltage sensor 22d, and the DC-side input/output current $I\_e$ of the external electric power supply converter apparatus 19 detected by the current sensor 23 as inputs to output the control signal $GP\_e$ provided to the engine electricity generation converter apparatus 17 to control the DC-side terminal voltage $V\_e$ to follow the DC power section reference voltage $V\_e\_ref$.

On each occasion, the inverter apparatus 4 calculates and outputs the inverter electric power $P\_t$ necessary to power the vehicles. In the inverter electric power $P\_t$ necessary to power the vehicle, the electricity storage apparatus 6 supplements the electric power that cannot be supplied only by the external electric power supply converter apparatus 19. The electric power instruction calculation unit 43 included in the chopper control unit 33 receives the inverter electric power $P\_t$ and the amount of stored electricity SOC of the electricity storage apparatus 6 as inputs to calculate and output the supplement electric power instruction $P\_d\_ref$ distributed to the chopper apparatus 5 according to the amount of stored electricity SOC.

The electric power stabilization controller 44b included in the chopper control unit 33 receives the supplement electric power instruction $P\_d\_ref$ to the chopper apparatus 5, the input/output current $I\_b$ of the electricity storage apparatus 6 detected by the current sensor 23d, and the terminal voltage $V\_d$ of the electricity storage apparatus 6 detected by the voltage sensor 22c as inputs to output the control signal $GP\_d$ provided to the chopper apparatus 5 to control the input/output electric power $I\_b \times V\_b$ of the electricity storage apparatus 6 to follow the supplement electric power instruction $P\_d\_ref$ for the chopper apparatus 5.

According to the above configuration, during powering in the non-electrified section, the engine electricity generation converter apparatus 17 controls to follow the voltage of the DC power section (A), and the electric power necessary to drive the vehicles is supplied to the inverter apparatus 4. If the electric power necessary to drive the vehicles cannot be supplied only by the engine electricity generation converter apparatus 17, the inverter apparatus 4 estimates shortfall of electric power, and the electricity storage apparatus 6 supplies electric power at least greater than the shortfall of electric power to the DC power section (A) through the chopper apparatus 5 while holding the voltage.

Next, configurations of control during braking in the non-electrified section in the device output balance control will be described.

A voltage stabilization controller 45 included in the chopper control unit 33 receives a DC power section reference voltage $V\_b\_ref$, the input/output current $I\_b$ of the electricity storage apparatus 6 detected by the current sensor 23d, and the terminal voltage V_d of the electricity storage apparatus 6 detected by the voltage sensor 22c as inputs to output the control signal GP_d provided to the chopper apparatus 5 to control the high-voltage side terminal voltage V_d of the chopper apparatus to follow a DC power section reference voltage V_d_ref.

On each occasion, the inverter apparatus 4 calculates and outputs the inverter electric power P_t necessary to brake the vehicles. The electric power instruction calculation unit 43 included in the chopper control unit 33 receives the inverter electric power P_t and the amount of stored electricity SOC of the electricity storage apparatus 6 as inputs to calculate and output the supplement electric power instruction P_e_ref to the engine electricity generation converter apparatus 17 in order for the engine 15 to supplement the electric power that cannot be supplied only by the external electric power supply converter apparatus 19 in the electric power necessary to drive the vehicles. The electric power stabilization controller 44a handles the supplement electric power instruction P_e_ref to the engine electricity generation converter apparatus 17, the input/output current I_e of the engine electricity generation converter apparatus 17 detected by the current sensor 23h, and the DC-side terminal voltage V_e of the engine electricity generation converter apparatus detected by the voltage sensor 22d as inputs to output the control signal GP_e provided to the engine electricity generation converter apparatus 17 to control the input/output electric power I_e×V_e of the engine electricity generation converter apparatus 17 to follow the supplement electric power instruction P_e_ref for the engine electricity generation converter apparatus 17.

According to the above configuration, during braking in the non-electrified section, the chopper apparatus 5 adjusts the electric charge and discharge of the electricity storage apparatus 6 to control the voltage of the DC power section (A) to follow the predetermined value, and the electric power generated by braking of the vehicles supplied from the inverter apparatus 4 is absorbed. If the electric power generated by braking of the vehicles supplied from the inverter apparatus 4 cannot be absorbed only by the chopper apparatus 5, the inverter apparatus 4 estimates shortfall of electric power, and the engine electricity generation converter apparatus 17 absorbs electric power at least greater than the shortfall of electric power.

As described above, according to the configuration, the presence/absence of the external electric power source, such as trolley wire, can be checked based on the received driving position information, and whether the electric power supply from outside of the vehicle is possible or impossible can be determined. If the electric power supply from outside of the vehicle is impossible, the external electric power supply means can be disconnected from the external electric power source. If the electric power supply from outside of the vehicle is possible, the external electric power supply means can be connected to the external electric power source. Furthermore, the arrangement of the system overall control apparatus that controls the current collection apparatus, the engine electricity generator, the electricity storage apparatus, the external electric power supply converter apparatus, the engine electricity generation converter apparatus, and the inverter apparatus and the information communication apparatus that reciprocally receives the control information of the system overall control apparatus allows comprehensive control of the devices. If the electric power supply from the current collection apparatus is impossible, the supplied electric power from the engine electricity generator serves as the main electric power supply to the inverter apparatus, and the engine electricity generation converter can control the DC voltage section to the predetermined voltage value.

Therefore, a high mobility railroad vehicle system can be provided in which through operation can be reciprocally carried out between a non-electrified section and an electrified section without installing new facilities such as oil supply equipment in the electrified section and without considering distinction between the non-electrified section and the electrified section.

REFERENCE SIGNS LIST

1 . . . vehicle, 2 . . . truck, 3 . . . wheel and axle, 4 . . . inverter apparatus (motor driving means), 5 . . . chopper apparatus (electric power conversion means), 6 . . . electricity storage apparatus (third electric power supply means), 7 . . . electric power transmission means, 8 . . . driving system control apparatus, 9 . . . information communication apparatus, 10 . . . information transmission means, 11 . . . vehicle coupler, 12 . . . electric power system coupler, 13 . . . information system coupler, 14 . . . spot sensor, 15 . . . engine (second electric power supply means), 16 . . . electricity generator (second electric power supply means), 17 . . . engine electricity generation converter apparatus (electric power conversion means), 18 . . . current collection apparatus (first electric power supply means), 19 . . . external electric power supply converter apparatus (electric power conversion means), 20 . . . main transformer, 21 . . . filter capacitor, 22 . . . voltage sensor, 23 . . . current sensor, 24 . . . smoothing reactor, 25 . . . external electric power supply converter circuit, 26 . . . inverter circuit, 27 . . . main motor, 28 . . . chopper circuit, 29 . . . engine electricity generation converter circuit, 30 . . . electricity generator, 31 . . . external electric power supply converter control unit, 32 . . . inverter control unit, 33 . . . chopper control unit, 34 . . . engine electricity generation converter control unit, 35 . . . electrostatic antenna, 36 . . . electric power supply means, 37 . . . position information transmission means, 38 . . . logic storage circuit, 39 . . . logical OR circuit, 40 . . . logic inverting circuit, 41 . . . logical AND circuit, 42 . . . logic delay circuit, 43 . . . electric power instruction calculation unit, 44 . . . electric power stabilization controller, 45 . . . voltage stabilization controller, 101 . . . first railroad vehicle, 102 . . . second railroad vehicle, 110 . . . electricity generation means, 120 . . . electric power conversion apparatus, 130 . . . driving wheel, 140 . . . electric power transmission means, 150 . . . electricity storage means, 200 . . . electric power management means.

The invention claimed is:

1. A driving system for a railroad vehicle comprising:
a current collection apparatus which obtains electric power from an electric power supply apparatus during presence in an electrified section of the railroad;
an in-vehicle electric power supply apparatus which includes an engine and a generator and generates electric power inside of the vehicle;
an electric power conversion apparatus which converts electric power from the current collection apparatus and the in-vehicle electric power supply apparatus to DC power at a first voltage value level; and
a motor driving apparatus which converts the DC power at the first voltage value level to AC power, and which drives a motor by the AC power;
wherein, in a case where the vehicle received a non-electrified section prediction signal from a first information transmission device which is installed on an electrified section side relative to a spot of a start of a non-electrified section, the motor driving apparatus and the electric power conversion apparatus are stopped so as to stop the driving of the motor by the electric power from the current collection apparatus, then when the vehicle reaches a spot after traveling a preset distance from a spot of the reception of the non-electrified section prediction signal, the current collection apparatus is moved to disconnect from the electric power supply apparatus, and then the electric power conversation apparatus and the motor driving apparatus are activated after the vehicle received a non-electrified confirmation signal from a second information transmission device, and wherein, in a case where the vehicle received an electrified section prediction signal from a third information transmission device which is installed on the non-electrified section side relative to a spot of the start of the electrified section, the motor driving apparatus and the electric power conversion apparatus are stopped so as to stop the driving of the motor by the electric power from the in-vehicle electric power supply apparatus, then when the vehicle reaches a spot after traveling a preset distance from a spot of the reception of the electrified section prediction signal, the current collection apparatus is made to contact the electric power supply apparatus, and then the electric power conversion apparatus and the motor driving apparatus are activated after the vehicle receives an electrified section confirmation signal from a fourth information transmission device.

2. A driving system for a railroad vehicle comprising:

a current collection apparatus which obtains electric power from an off-vehicle electrified section of a railroad, during presence of the railroad vehicle in the electrified section;

an on-vehicle electric power supply apparatus which includes an engine and a generator, and which generates electric power on the railroad vehicle;

an electric power conversion apparatus which converts electric power from the current collection apparatus and the on-vehicle electric power supply apparatus, to DC power; and a motor driving apparatus which converts the DC power to AC power, and which drives a motor of the railroad vehicle by the AC power;

wherein, in a case where the railroad vehicle received a non-electrified section prediction signal on approaching a spot of a start of a non-electrified section of the railroad, the motor driving apparatus and the electric power conversion apparatus are stopped so as to stop the driving of the motor by the electric power from the current collection apparatus, then when the railroad vehicle reaches a spot after traveling a preset distance from a spot of the reception of the non-electrified section prediction signal, the current collection apparatus is set not to provide electric power and the on-vehicle electric power supply apparatus is set to provide electric power, and then the electric power conversation apparatus and the motor driving apparatus are activated after the railroad vehicle received a non-electrified confirmation signal, and wherein, in a case where the railroad vehicle received an electrified section prediction signal on approaching a spot of the start of the electrified section, the motor driving apparatus and the electric power conversion apparatus are stopped so as to stop the driving of the motor by the electric power from the on-vehicle electric power supply apparatus, then when the railroad vehicle reaches a spot after traveling a preset distance from a spot of the reception of the electrified section prediction signal, the current collection apparatus is set to provide electric power and the on-vehicle electric power supply apparatus is set not to provide electric power, and then the electric power conversion apparatus and the motor driving apparatus are activated after the railroad vehicle receives an electrified section confirmation signal.

* * * * *